April 21, 1942.  M. W. WIEGAND  2,280,137
METHOD OF FABRICATING A THERMO-ELECTRIC ELEMENT
Filed Aug. 4, 1939   3 Sheets-Sheet 1
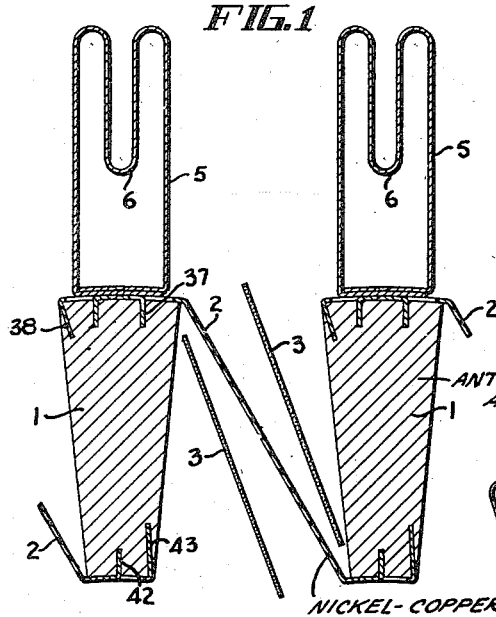
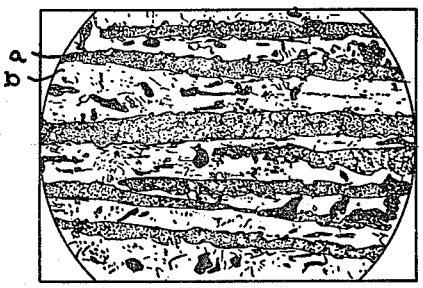
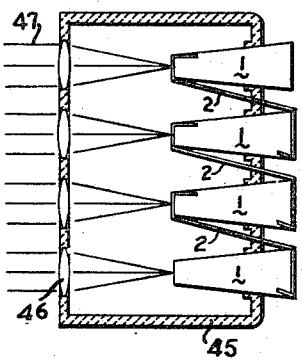
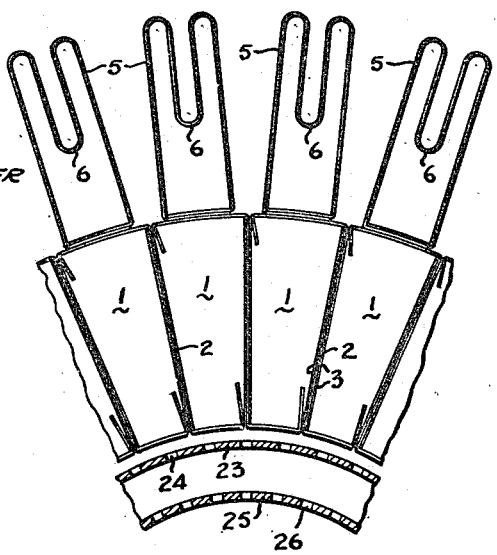
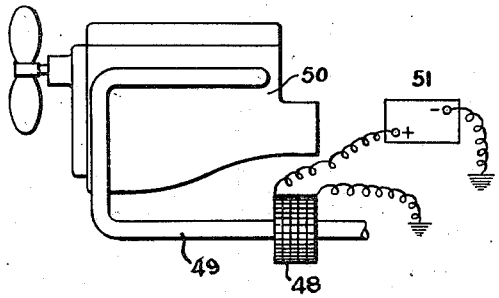
INVENTOR
MARTIN W. WIEGAND
ATTORNEYS

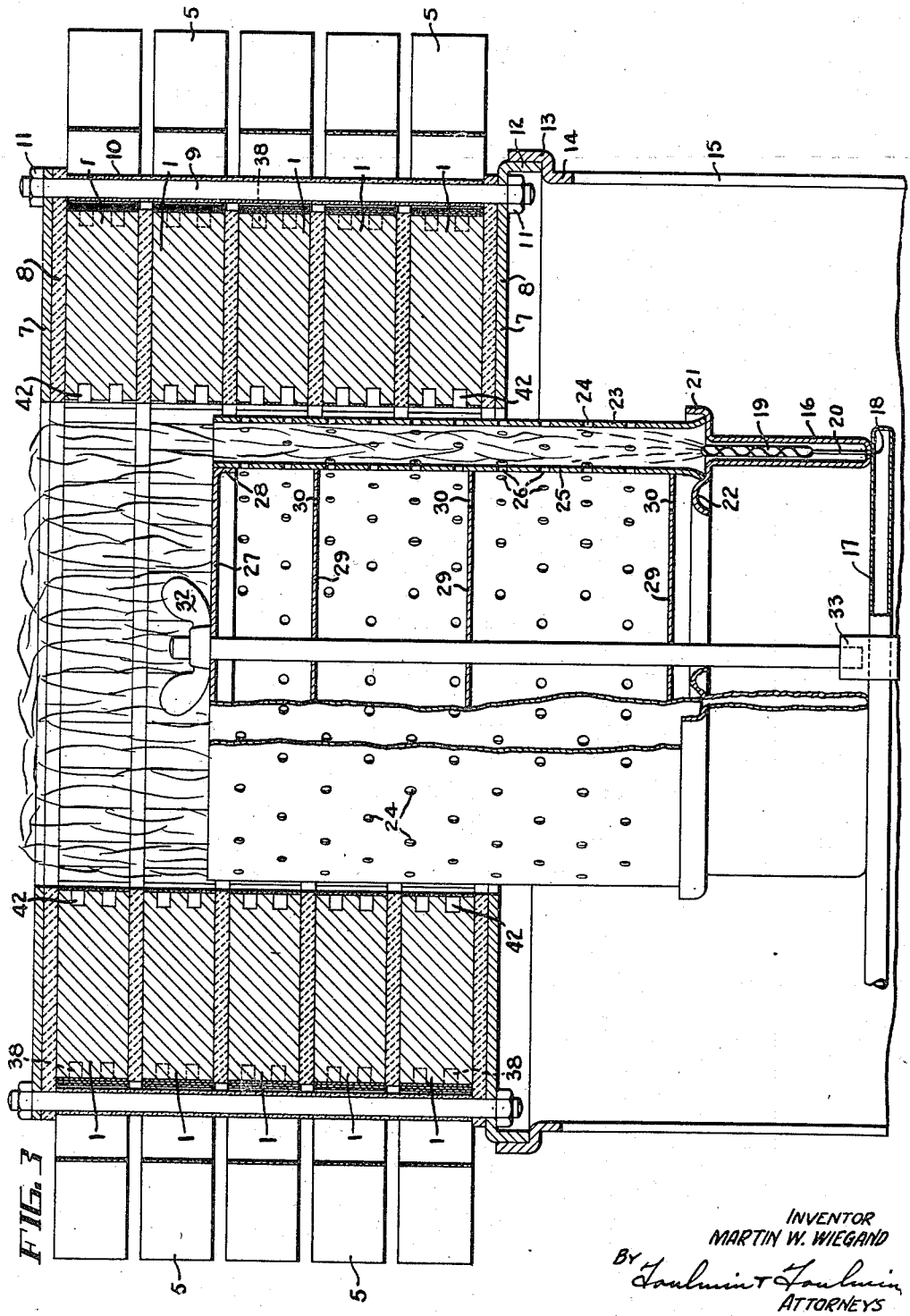

April 21, 1942.  M. W. WIEGAND  2,280,137
METHOD OF FABRICATING A THERMO-ELECTRIC ELEMENT
Filed Aug. 4, 1939  3 Sheets-Sheet 3
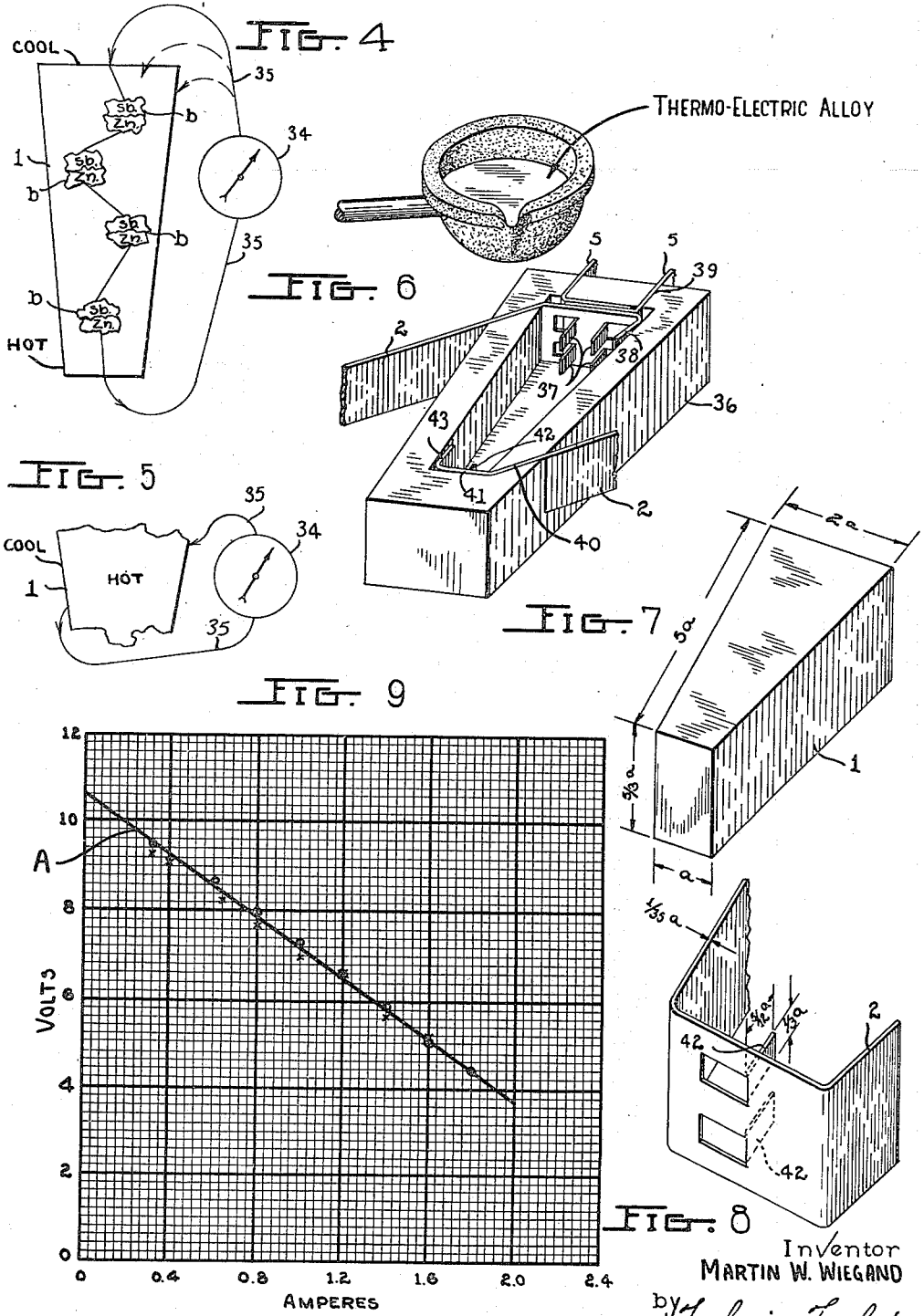
Inventor
MARTIN W. WIEGAND
Attorneys Patented Apr. 21, 1942

2,280,137

UNITED STATES PATENT OFFICE 2,280,137

METHOD OF FABRICATING THERMO-ELECTRIC ELEMENTS

Martin W. Wiegand, Cincinnati, Ohio, assignor to The Huenefeld Company, Cincinnati, Ohio, a corporation of Ohio Application August 4, 1939, Serial No. 288,409

2 Claims. (Cl. 136—5)

The present invention relates to thermoelectric generators.

Generators of electricity, which depend for their effectiveness on the application of heat, are well known in the art, examples of which are found in the so-called thermopile, thermocouple and thermometers employing a thermocouple, which are known on the market as bolometers or thermopyrometers. It is, of course, well known that the value of the electromotive force developed by a thermocouple depends upon the difference between the temperature of the joint of the thermoelectric couple and the temperature of the remainder of the circuit. If the current derived from this electromotive force flows through an ammeter or galvanometer, the reading of the instrument will be proportional to the temperature at the joint.

Many attempts have been made to use the thermoelectric principle in the design of apparatus for producing electrical energy directly from heat on a large enough scale to be of practical use. The electromotive force generated at the joint between two dissimilar metals, even when these metals have been taken from opposite ends of the thermoelectromotive force series of elements, was so small as to have little or no practical value, except in the art of temperature measurement.

As a typical example of the inadequacy of the electrical energy so generated, a modern text book on electricity states that "since the E. M. F. of a bismuth-antimony pair when the junctions are at 0° and a 100° is only about 0.01 of a volt, it would require more than a hundred pairs to yield one volt."

The primary object of the invention is to provide an improved method by which thermoelectric energy of considerable amount is obtained by the use of practical temperature gradients.

Another object is to provide an improved method by which thermoelectric energy of an amount sufficient to operate a radio set or other commercial devices is obtainable from thermocouples using amounts of heat so low as to be capable of being derived from common and inexpensive sources. These objects are attained, in brief, by providing a thermoelectric alloy, the crystals of which are so oriented that upon the application of heat to the alloy considerable currents are generated at the surface of the alloy. These currents may be taken from the alloy by metal strips which form thermoelectric junctions with the alloy, but only one of which is heated. The other junction is cooled.

In accordance with the present invention, as will be hereinafter explained, I have devised a thermoelectric generator and an improved method for operating the same which has in all only 150 junctions between dissimilar metals and, when subjected to a temperature gradient of as little as 600° F., is capable of delivering a voltage as high as fifteen volts and, in terms of energy, will deliver a current of one ampere at ten volts, and two amperes at eight volts. Proportionally greater or less energy values may be obtained when the number of thermocouples and the temperature gradients are increased or decreased. It will be appreciated that the energy and temperature values are well within practical considerations.

My invention is based, in part, on the discovery that one or more alloys composed of a large number of thermoelectric couples which, upon being subjected to a temperature gradient, produce an electromotive force of practical magnitude across any two surfaces of the alloy. For optimum results, I find it desirable to subject one surface of the alloy to a source of radiant energy or indirect heat and to subject an opposing or adjacent surface of the alloy to a cooling medium.

The invention will be better understood when reference is made to the following description and the accompanying drawings, in which—

Figure 1 is an expanded view of two of the improved thermoelectric units connected together in a linear arrangement.

Figure 2 is a plan view, partly in section, of a typical shape which the improved thermoelectric units may take when constructed in segmental form. This figure also shows a double wall burner which is conveniently employed for heating the thermoelectric units.

Figure 3 is a cross-sectional view, partly in elevation, of an improved thermoelectric generator composed of a large number of the improved thermoelectric units connected in series to form layers, and the layers in turn are connected in series to add the electromotive forces generated by the individual units.

Figure 4 is a diagrammatic view of the improved alloy suggesting the manner in which the crystals of the alloy orient themselves to produce an aggregate thermoelectric effect at the surfaces of the alloy.

Figure 5 is a view similar to that shown in Figure 4 except that the alloy is represented as a fragment to indicate that it retains its thermoelectric effect even when broken into pieces.

Figure 6 is a perspective view of a mould useful in making the thermoelectric alloy and securing the conductance thereto.

Figure 7 is a perspective view of the alloy in segmental form which has been found to give optimum results.

Figure 8 is a fragmentary perspective view of a strip connector secured to the alloy by inwardly extending tabs.

Figure 9 is a graph showing the electrical performance of the improved thermoelectric alloy.

Figures 10 and 11 show modifications of the sources of radiant energy or indirect heat for exciting the improved thermoelectric alloy.

Figure 12 is a diagram showing, in highly magnified size, a typical cross section of the thermoelectric crystal structure.

Referring more particularly to Figures 1, 2 and 3, numeral 1 represents a thermoelectric unit or member which has the property of developing a considerable amount of E. M. F. across two opposite faces when the constituents of the unit are of the character and are made in a manner to be described hereinafter. These units preferably have a wedge-shaped form, for practical reasons, and are preferably cast as a block of uniform thickness, as can be seen more clearly in Figure 7. A number of these units are assembled together, with the smaller width portions extending in the same direction so that, when assembled, they form a cylinder of closed configuration and have a thickness determined by the thickness of the block. The sides of each segmental block are electrically insulated from one another, except for a conductor 2 which makes contact with the outer surface of one block and the inner surface of the next adjacent block, as can be seen more clearly in Figures 1 and 2. The segmental blocks or units 1 are insulated from one another by means of strips of mica 3 which are interposed between the conducting strips 2 and the converging sides of the block.

As will be seen more clearly from Figure 1, the strips 2 are preferably secured to opposite faces of the segmental block by means of tabs 37 which are moulded into the alloy, as will be explained hereinafter. The end of the strip 2 which contacts with the outer surface of the unit 1 is sufficiently long to extend over the entire width of the surface and to provide a leg 38 which is also preferably moulded into the alloy. The strip 2 at the opposite end of the unit 1 is provided with a leg 43 which is similarly moulded into the alloy, as also will be explained hereinafter.

The lower end of the block 1, as seen in Figure 1, will be termed hereinafter the hot junction and the upper end of the block will be termed the cold junction. For cooling the upper end of the block I prefer to employ a copper strip 5, the width of which preferably is the same as the thickness of the block, and the middle of the strip being bent into a U-shaped configuration as indicated at 6. The lower ends of the strip 5 are bent so as to overlap one another and form a flat portion which may be spot welded, or in any other suitable manner secured to the upper surface of the strip 2.

For the material of the block 1, I prefer to employ an alloy which is constituted in part of antimony. The other alloy constituent is preferably zinc with the antimony ranging between 67 per cent to 55 per cent and the zinc between 33 per cent to 45 per cent to make a 100 per cent alloy. As will be explained in connection with the moulding operation, there is also a small amount of flux, preferably dechlorinated salt and a trace of arsenic in the alloy. Instead of employing zinc, I may use any metal having a lower melting point than antimony and which provides a malleable matrix for the antimony particles. For example, cadmium may be employed in place of zinc. Silver may be used in place of the antimony. An alloy which has been found to operate particularly satisfactorily is composed of 66 per cent antimony, 34 per cent zinc, ten ounces of dechlorinated salt per 100 pounds of antimony and a trace of arsenic. It will be understood that these percentages may be varied considerably or at least within the ranges set forth above with corresponding results. The segmental blocks 1 may have any convenient size and shape, but I have found that good results are obtainable when the narrowest width of the segment is approximately 3/8" and the wider width is approximately 3/4" and the segment has a length of approximately 1 7/8" and a thickness of approximately 5/8".

The length of the block as given has been found adequate to provide a readily obtainable temperature gradient when using ordinary cooling means such as air cooling without necessitating an extremely high temperature at the hot junction end. The segments may be made considerably shorter, even to the extent of being two-thirds as short if adequate cooling means were employed to sustain the required gradient. For example, instead of cooling the cold junction by air currents, this junction may be cooled by liquid air, dry ice or forced refrigeration, in which case the length of the segment can be materially reduced. This length seems primarily important only as a factor of permitting adequate resistance to the heat transition from the hot junction to the cold junction end. While I have illustrated these blocks as being of solid construction, it may be desirable to make them of hollow configuration in which case they would weigh less and would cause a reduction of the fragility of the alloy by providing chilled surfaces on the interior of the block as well as on the exterior thereof. Structural reinforcing members could be cast or otherwise inserted in the walls of the hollow blocks so that the thickness of the walls can be still further reduced.

For the electrical conductor 2, I prefer to employ a strip of metal which does not readily corrode upon being heated and which has the same width as the thickness of the block to which it is secured in any suitable manner. Two ways of accomplishing this will be described presently. The metal which I prefer to employ for this purpose is known on the market as "copel" which consists of 46% nickel and 54% copper.

When tests on the block of alloy containing antimony and zinc in the percentages above noted and provided with copel connectors at each end, and subjecting the block to a temperature gradient of approximately 600° F., I have obtained a voltage of approximately 1/10 of a volt. However, it will be understood that, as the temperature gradient is increased, for example, by heating the hot junction end to a temperature as high as 1000° F., slightly less than the melting point of the alloy and cooling the cold junction end to as low a temperature as —60° to —100° F., it is possible to increase this voltage very materially. These low temperatures can readily be obtained by apparatus known to those skilled in the art. Assuming that a temperature gradient specifically mentioned above is employed, when thirty of these units are assembled per layer and five layers are held in a rigid structure by the retaining plate 6, the electromotive force theoretically obtainable between the first and last terminals of the units in aggregate is 150×.1=15 volts. However, due to looseness of contacts and other resistance losses, there is actually available at the terminals 4 of the generator, a voltage of approximately eleven volts, as indicated by the line A on the graph in Figure 15. The voltage varies as a linear function of the current, as the latter is increased up to approximately two amperes. The voltage at the two-ampere load is approximately four volts, giving an electric energy output of approximately eight watts. The characteristic "A" has been drawn not only through the performance points (marked "x") as the current is increased, but through the equivalent points (marked "O"), as the current is decreased, showing that the relation between the current and voltage varies as a linear function regardless of whether the current is being increased or decreased. This is of importance in connection with certain kinds of electrical loads.

It is apparent that the voltage and ampere output of the improved generator of the sizes and construction mentioned is more than ample to provide the energy requirements of a commercial radio set or, in fact, many other electrical devices or uses such as charging storage batteries, as will be explained in connection with Figure 11, lighting hen houses, operating incubators, etc., and other uses which will readily occur to those merely skilled in the art.

As is hereinafter pointed out, the block 1 preferably takes the form of a segment, with a wide dimension at the outer face and a small dimension at the inner face. It is apparent that a configuration of this character lends itself readily to the formation of a cylinder, a portion of which is shown in Figure 2. However, it will be understood that my improved generator operates equally well when the segments are arranged in linear fashion.

In Figure 3, I have shown a plurality of layers of thermoelectric blocks, all connected together and each layer composed of a large number of thermoelectric units. The generator shown in Figure 3 is composed of thirty units per layer, all connected in series by means of the conductors referred to hereinbefore, and five layers similarly connected so that the E. M. F. produced in all of the individual units by a heat source contained within the cylinder add to provide a considerable voltage between the first unit of the uppermost layer and the last unit of the lowermost layer. The characteristic "A" as shown in Figure 9, represents the current and voltage output obtainable by the generator shown in Figure 3 when the inner surfaces or hot junctions of the unit 1 are heated to a temperature approximately 800 degrees F. and the outer surfaces or the cold junctions of the units 1 are cooled to a temperature approximately 200 degrees F.

For holding the layers of thermoelectric units in a rigid structure, I may provide a pair of plates 7, separated from the upper surface of the uppermost layer and the lower surface of the lowermost layer by a layer of asbestos 8. These plates are of somewhat larger diameter than the diameter of the thermoelectric layers and contain a plurality of holes which are adapted to receive bolts (preferably four) insulated from the outer surface of the thermoelectric units by a fiber or asbestos tubing 10 which surrounds each bolt. Thus, by tightening up the end nuts 11, the five layers of thermoelectric units or any other desired number may be held rigidly in position and the units themselves held rigidly within their respective layers.

While I have described this specific generator as being constituted of five layers of thermoelectric units, it will be understood that any number of layers may be used as desired and any number of segments per layer employed. It is obvious that the improved generator may be designed to contain perhaps thousands of thermoelectric units arranged in any suitable number of layers to produce voltages as high as 440 volts. For these voltages, it is desirable to connect the units in series. However, if desired, the layers may be arranged in parallel or in parallel-series relation to give any desired relation between the current and voltage values.

For supporting the thermoelectric generator from the floor, the lower plate 7 may be provided with a downwardly extending flange 12 which fits within a flange 13 of a cylinder 14. The latter preferably is provided with large openings 15 of circular configuration for ventilation purposes, as will be explained hereinafter. The interior diameter of the retaining plate 7 corresponds to the interior diameter of each cylindrical layer so that, when the five layers are assembled and rigidly held between the plates 7, the structure takes on the shape of an elongated hollow cylinder having an opening of considerable size, which extends the length of the entire thermoelectric structure.

As stated hereinbefore, my improved thermoelectric generator operates by applying energy, preferably of the radiant or indirect type, and preferably in the form of heat, to one end of each segmental block, while cooling the other end. It has been found that, when the conductor strip 2 is constituted of a dissimilar metal from the metal of the block 1, the temperature gradient which is thus established by the heat source serves not only to produce thermoelectric currents within the block or unit itself, but also at the junction between the block and the conductor 2.

For a source of heat and from the standpoint of cost and availability, I prefer to employ a burner using an inexpensive oil such as kerosene. Referring again to Figure 3, this burner may comprise a cylindrical bowl 16 having a U-shaped cross section, i. e., open at the top and closed at the bottom.

The bowl 16 is secured, for example, by welding to the top surface of a horizontally disposed pipe or conduit 17 having a pair of openings 18 communicating through the pipe into the interior of the member 16 in opposite diametral positions. The bowl contains a lighting ring 19 in the form of a cylindrical strip of asbestos and preferably positioned above the openings 18 by a wire support 20. The upper end of the ring extends to a position just above the annular opening in the member 16. The latter is provided with an outwardly extending flange 21 and an inwardly rolled edge flange 22.

Resting in the recess of the flange 21, there is an upstanding apertured metal cylinder 23 which extends to a position approximately just above the third layer of the generator. The apertures are indicated at 24. There is also an apertured upstanding cylinder 25 resting in the recess of the flange 22, this cylinder extending to approximately the same height as the outer cylinder. The openings in the inner cylinder are indicated at 26. The cylinder 25 is provided with a top piece 27, flanged as at 28 snugly to fit within the cylinder to which it is secured as by welding.

Along the length of the inner cylinder and spaced at distances as indicated on the drawings, there is a plurality of transversely extending partitions 29 which have around their outer edges a number of openings 30. The inner cylinder is pressed against the flange 22 by means of a threaded bolt 31 provided with a wing nut 32. This nut bears against the upper surface of the top piece 27. The bolt is secured at the end opposite from the nut 32 to a lug 33 welded or otherwise secured to the conduit 17. The outer cylinder 23 is preferably left loose on the flange 21 so as to be removable for igniting purposes.

The conduit or pipe 17 may pass through a hand-operated valve (not shown) of any suitable and well-known type to an oil reservoir (not shown). Thus, oil is fed from the reservoir and controlled with the valve to the openings 18. As the oil rises in the annular space to a level just above the lower edge of the ring 19, the latter becomes saturated, and, after being ignited, the flame will extend upwardly between the double-walled combustion chamber 23, 25 to a distance, practically as high as the upper surface of the upper layer of the generator, as is indicated on the drawings. After the flame becomes ignited, the level of the oil drops to a position below the lower edge of the lighting ring so that oil is fed to the combustion chamber purely as a vapor which finds its way between the oil and inner surfaces of the lighting ring and the adjacent surfaces of the bowl.

The oxygen for combustion is obtained from the air which passes through the openings 15 in the casing 14 and also through the openings under the conduit 17, passing upwardly through each of the openings 30 and into the inter-cylinder space through the openings 26. Air also passes through the openings 24. The size and position of the openings 26, 24, also the distance between the partitions 29 and between the top piece 27 and the upper partition 29 are such as to cause oxygen to be fed at different levels into the combustion chamber between the walls 23 and 25 and at such a rate as to provide a flame of uniform intensity and height.

It will be noted that the outer cylinder 23 extends upwardly only over the three lower layers of the generator and, therefore, protects the thermo-electric units directly from the flame, at least over this region. The draft or chimney effect introduced by the openings 24, 26 is such as to cause the flame to emerge at the upper end of the burner as a jet following its original direction and, therefore, spaced from the inner surfaces of the thermoelectric units 1. If desired, a draft-directing cup (not shown) may be secured to the upper end of the generator to assist in directing the flame away from the upper two layers. It is, therefore, apparent that the heat obtained either from that portion of the flame contained between the cylinders 23, 25, or the portion of the flame which extends beyond the cylinders is applied solely by radiation to the inner surfaces of the thermoelectric units. It is desirable that the flame be prevented from contacting with the units, although it will be understood that the improved thermoelectric generator will still operate under these conditions. By positioning the flame remote from the units 1, the latter receives its heat indirectly and at a far more constant rate than if the flame itself were permitted to touch each unit. Thus, the electric energy output of each unit tends to be considerably more constant when the heat source is of the indirect or radiant energy type.

As is explained hereinbefore, I prefer to cool the outer surface of each thermoelectric unit and for this purpose there is employed the copper strips 5, as shown in Figures 1, 2 and 3, secured to each unit.

In practice, enough oil is provided through the pipe 17 as determined by the hand-operated valve, to heat the inner surface of each thermoelectric unit to a temperature in excess of 800 degrees F. The strips 5 constitute heat-radiating fins and are so designed, particularly as to length, as to radiate enough heat to maintain the ends of the units to which they are attached, at a temperature not much above 200 degrees F. If desired, cool or refrigerated air may be blown through the fins, or fans may be employed, but it has been found, in practice, that when properly designed, the convection of room air is more than sufficient to maintain the cold junction end of the thermoelectric unit at 200 degrees F. or less, while the opposite end is being heated to a temperature of not less than 800 degrees F. Thus, the burner constitutes a source of radiant energy and, together with the fins 5, subjects each unit 1 to a temperature gradient of approximately 600 degrees F. As stated hereinbefore, this temperature gradient is such as to cause a thermoelectric current to be generated not only between the alloy and each strip 2 but also between each thermocouple which forms the crystalline structure of the alloy.

The thermoelectric effects obtained with the crystalline structure is diagrammatically illustrated in Figures 4 and 5 in which the internal thermocouples of antimony and zinc are indicated in exaggerated form at "b" to show that this thermoelectric effect is obtained through the structure of the alloy. The strips 2 have been eliminated from these two figures and still, upon heating one portion of the unit 1 relative to another portion, an electromotive force can be shown to be produced between two opposed surfaces or faces of the unit. This phenomenon is graphically illustrated by the electrical measuring device 34 from which connections 35 are taken to the two opposite ends of the unit 1.

Figure 11 shows that a thermoelectromotive force is produced across diagonal corners of a fragment of the alloy when the latter has been heated on the interior and cooled on the exterior. For example, I have obtained an appreciable electromotive force by heating the alloy to a temperature of approximately 800 degrees F. and then permitting the exterior surfaces of the alloy to be cooled by room air so as to produce a temperature differential or gradient between the interior of the alloy and the exterior surface.

While I do not wish to be limited to any theory, it is possible that this phenomenon is due to the manner in which the crystals of antimony and zinc occur in the unit 1 during the moulding process which will be described presently. The crystal arrangement may be such that zinc forms a malleable matrix for the antimony, and the particles of zinc and antimony so orient themselves as to form thermocouples, all of which are poled in a series manner to cause their respective electromotive forces to add. These electromotive forces in the aggregate are available between any two surfaces of the alloy when the latter is subjected to a temperature gradient. It is entirely possible that at the melting heats and proportions of the metals used instead of a simple alloy of antimony and zinc being formed in which the zinc is the matrix, one of two compounds of zinc and antimony structurally separated into a matrix and crystal is obtained. One of these compounds may be constituted of $Zn_3Sb_2$ (three molecules of zinc, two molecules of antimony), which chemically is composed of 44.6% zinc and 55.4% antimony and melts at 1,051° F., while the other is ZnSb (equal number of molecules of zinc and antimony, i. e., equal in bulk but not weight), which is 65.1% antimony and 34.9% zinc by weight and melts at 998° F. The first of the two mentioned compounds, therefore, has a complex structure in that the zinc and antimony molecules do not appear in equal proportions. The other of the two compounds has a simple structure in that molecules of zinc and antimony appear in equal numbers.

The structural characteristics of the arrangement of these compounds in the block is shown in the micro photograph, a copy of which in magnified form, is illustrated in Figure 12. The dark strata indicated at $a$, depicts the compound having the low zinc content, i. e., the ZnSb compound, while the light strata indicated at $b$, depicts the compound having the high zinc content, i. e., the $Zn_3Sb_2$ compound. It is apparent that the simple and complex metallic compounds alternate with one another and there is some experimental basis to indicate that the improved thermoelectric effect is obtained at the boundaries between each pair of compounds. These boundaries are broadly suggested by the full lines running across the figure and separating the dark portions from the light portions of the sketch. Thus, myriads of thermoelectric couples exist along the numerous boundaries, each couple comprising metallic compounds of dissimilar character but both containing zinc and antimony in different proportions. In case other metals are used instead of antimony and zinc, as explained hereinbefore, similar layers in alternate arrangement will be formed by the improved moulding process described hereinafter, to provide thermoelectric effects throughout the long boundary lines which separate one inter-metallic compound from the other inter-metallic compound.

My invention, therefore, contemplates the use of any combination of metals in the thermoelectric series, which upon being melted together, as explained hereinafter, forms striations or layers of different inter-metallic compounds separated by a thermoelectric junction at the boundaries between the compounds.

But regardless as to whether the theory in which the zinc forms a matrix for the antimony or the theory in which the zinc and antimony go into a solution to form striations of different compounds by which the improved thermoelectric effects are obtained is correct, it is a fact established by numerous tests that, when thirty of the units, as described hereinbefore, are connected in series, electromotive force and current values, such as indicated in Figure 9, are obtainable when employing a temperature gradient as little as 600° F. It will be understood that, when greater temperature gradients are employed, for example, when the hot junctions are heated to approximately 1000° F., and the cool junctions are cooled to a temperature of $-60°$ F., to $-100°$ F., in any suitable and well-known manner, considerably greater voltages and currents are available. It will also be understood that the relation between the voltages and currents can be varied by changing the electrical connection of the units from series to parallel or series-parallel.

I have obtained optimum results by way of electromotive force and current values when employing units of the size and shape described hereinbefore, but Figure 5 will show that the thermoelectric property is inherent in the alloy, regardless of its shape or size. I have also found that, in general, as the size of the unit is increased, the current is increased in a corresponding degree, but the voltage does not increase in the same proportion. For the most satisfactory results, it is desirable to maintain the general proportions between the various dimensions, also the shape of the unit as exemplified in Figure 7. Assuming that the narrow width is $a$, the width of the wider portion should preferably be $2a$; the length of the unit should be $5a$, and the thickness of the unit should be $5/3a$.

The manufacture of the unit and a desirable method of securing the strip connectors thereto are illustrated in Figures 6 and 8. A mould 36 of a refractory metal is provided having an interior shape corresponding to the shape of the segment. The strip 2 which connects with the outer surface of the unit or segment is preferably provided with four vertically extending tabs 37 pressed out of the metal, as indicated in Figure 6. This strip is of sufficient length to extend flatwise against the end of the mould, leaving an end portion which bears against the side of the mould and is bent at an angle with respect thereto as indicated at 38. Between the mould and the abutting portion of the strip 2, the lower flat portions of the fins 5 are pressed and held in position by a pair of slots 39 formed in the edge of the mould. The other strip 2 passes through a diagonal slot indicated at 40 in the edge of the mould and terminates in a flat portion 41 which contains a pair of inwardly extending tabs 42 (Figure 8). The end portion 41 terminates in a bent portion 43 (Figure 6) which is bent at an angle with respect to the side of the mould.

For the manufacture of the thermoelectric unit, I prefer to first test the antimony in its raw state by flame to determine whether any arsenic is present. A trace of arsenic is present in some antimony and is needed in the fusing of the crystal, its action being that of a flux to assist the formation of many minute crystals during the melting of antimony. If there is no arsenic in the metal, a small amount is added in the next step which is to melt the antimony. This is done at 1350 degrees F., at which temperature, the metal is light red in color. There is then added a flux which breaks up the antimony into the finest possible condition and drives off any gas that is present in the molten mass. Suitable fluxes for this purpose are ordinary salt, magnesium, beryllium and vanadium. From the standpoint of cost and result, experiment shows salt to be the best of these fluxes. However, before it is introduced into the molten antimony, it must be heat treated for a couple of hours at a temperature of 800 degrees to 900 degrees F. to dechlorinate the salt, i. e. to drive off uncombined chlorine and other impurities. After this treatment, the salt is dark brown in color, and it is added to the antimony in the proportion of five ounces to a hundred pounds of antimony.

Zinc is added with the temperature remaining at 1350 degrees F. and its addition should be accompanied by extreme vigilance to prevent appreciable lowering of the temperature or too rapid a mixing of the metals. The final step in the process is the pouring of the mixture into the mould 36, the metal being maintained at a temperature of approximately 1350 degrees F. during this step.

The molten metal will fill up the entire mould, encompassing the tabs 37 and 42 and flowing between the strip extensions 38 and 43 and the side of the mould, thus securely holding the strips 2 and the fins 5 to the unit 1. It will be noted that the tabs 37 and 42, in extending inwardly into the cast metal, tend to reduce the resistance of the latter slightly in the longitudinal direction. For this reason, the tabs should not be too long and yet they must have sufficient length and width securely to hold the strips 2 in place. I have found that, when the block 1 is of the dimensions set forth hereinbefore, particularly good results are obtained by way of securing the strips 2 in the block or segment without reducing the resistance to an excessive degree when the tabs have a dimension of approximately 1/8" wide, i. e., as measured in the vertical direction, and 5/32" long as measured in the horizontal direction. As the size of the unit 1 is increased, the length and width of the tabs should be increased accordingly. Thus, in Figure 8, the depth of the tab is given as 1/3a, where a is the width of the narrowest dimension of the segmental unit (Figure 7). Likewise, the length of the tab is given as 5/12a.

In practice, a number of thermoelectric units 1 are cast simultaneously in a multiple mould, even as many as thirty or more to form one of the five layers shown in Figure 3. If desired, a number of individual moulds 36 may be employed for this purpose and after being cast to form, as indicated in Figures 1 and 7, the adjacent units 1 may be brought together, as shown in Figure 2, and insulated from one another by the mica strip 3, as illustrated in Figures 1 and 2.

Instead of providing the strips 2 with tabs which are cast into the metal, other fastening means may be employed. For example, an anchor stud (not shown) may be cast into each segment and the strips 2 secured to the stud.

It was explained hereinbefore that the improved thermoelectric generator gives optimum results when employing radiant energy or indirect heat for exciting the inner surface of each unit. In Figures 10 and 11, I have shown additional sources of radiant energy for performing this purpose. Thus, in Figure 10, a number of the units 1 are arranged rectilinearly and supported within the cylinder casing 45 of insulating material with the narrower end of each unit presented to individual condensing lenses 46 mounted in the casing. Energy from the sun or other source of light or heat, as indicated at 47, is condensed by the lenses on to each unit, thus causing the generation of electric currents within each unit and at the junction between the connecting strip and the unit. The units are connected in series and this current may be taken from these units in any suitable manner.

Figure 11 shows another application of my improved thermoelectric generator in which the interior hot junction of a five-layer generator, indicated at 48, is heated by the exhaust manifold pipe 49 of a gas engine 50. In the case of an automotive vehicle, the generator may be employed to charge the storage battery equipment 51 since, as pointed out in connection with Figure 3, an appreciable current can be generated at voltages in excess of six volts.

While I have indicated that it is preferable to employ radiant energy or an indirect source of heat for heating or otherwise exciting the hot junction end of the units 1, it is to be understood that the units will still operate, perhaps not with optimum results, however, in case the source of heat were actually to touch or contact with the hot junction. It has been found that by applying an indirect source of heat or radiant energy to the unit indicated by the double-walled kerosene burner shown in Figure 3 and the heating sources shown in Figures 10 and 11, the voltage output of the generator remains strictly constant.

The claims in this application are directed to the method of manufacturing the improved thermo-electric generator. In my copending application Ser. No. 288,408 there are claims on the improved thermo-electric generator considered from the article or structure standpoint.

It will be understood that I desire to comprehend within my invention such modifications as come within the scope of the claims and the invention.

Having thus fully described my invention, what I claim as new and desire to secure by Letters Patent, is:

1. In the art of fabricating a thermo-electric element, the method which comprises heating antimony to a temperature of approximately 1350 degrees F., then adding a flux of sodium chloride and a trace of arsenic while maintaining the temperature at approximately 1350 degrees F., then adding zinc to the mixture in the ratio of 36 to 45 parts to 64 to 55 parts of antimony for 100 parts alloy while still maintaining the temperature at 1350 degrees F., and finally molding the mixture into a desired shape.

2. In the art of fabricating a thermo-electric element, the method of melting a quantity of antimony at a temperature of approximately 1350 degrees F. and while maintaining this temperature adding to the melted antimony a trace of arsenic and a quantity of sodium chloride in the proportion of ten ounces to every one hundred pounds of antimony, thereafter adding to the mixture while maintaining the same temperature a quantity of zinc in the proportion ranging between $33/67$ and $45/55$ times the weight of the antimony, the zinc being added at such a slow rate as to permit the mixture to remain at 1350 degrees F. until all of the zinc has been added, and then finally pouring the melted mixture into a desired shape.

MARTIN W. WIEGAND.